(12) United States Patent
Satzger et al.

(10) Patent No.: US 6,273,453 B1
(45) Date of Patent: Aug. 14, 2001

(54) AIR BAG WITH AT LEAST ONE FOAMABLE CHAMBER

(75) Inventors: Guido Satzger, München; Alois Juchem, Petershausen; Sven Rau; Peter Tiefenthaler, both of München, all of (DE)

(73) Assignee: Autoliv Development AB (DE)

( * ) Notice: Subject to any disclaimer, the term of this patent is extended or adjusted under 35 U.S.C. 154(b) by 0 days.

(21) Appl. No.: 09/528,771

(22) Filed: Mar. 17, 2000

(30) Foreign Application Priority Data

Mar. 19, 1999 (DE) .............................. 199 12 531
Mar. 19, 1999 (DE) .............................. 199 12 540

(51) Int. Cl.[7] ....................... B60R 21/16; B60R 21/26; B60R 21/28
(52) U.S. Cl. .................. 280/728.1; 280/736; 280/741
(58) Field of Search .................... 280/729, 731, 280/736, 737, 738, 740, 741, 743.1, 728.1, 750; 422/166; 102/531, 530

(56) References Cited

U.S. PATENT DOCUMENTS

| 2,974,912 | 3/1961 | Namsick . | |
|---|---|---|---|
| 4,998,751 | * 3/1991 | Paxton et al. ................ | 280/741 |
| 5,322,322 | 6/1994 | Bark et al. . | |
| 5,582,427 | * 12/1996 | Rink et al. .................. | 280/740 |
| 5,806,887 | * 9/1998 | Tanaka et al. ................ | 280/741 |
| 6,059,312 | * 5/2000 | Staub et al. .................. | 280/729 |
| 6,170,868 | * 1/2001 | Butt et al. .................. | 280/737 |
| 6,176,517 | * 1/2001 | Hamilton et al. ............. | 280/736 |

FOREIGN PATENT DOCUMENTS

| 19514681 | * 4/1995 | (DE) . |
|---|---|---|
| 295 16 703 U1 | 2/1996 | (DE) . |
| 297 03 360 U1 | 8/1997 | (DE) . |
| 196 24 328 A1 | 1/1998 | (DE) . |

* cited by examiner

*Primary Examiner*—J. J. Swann
*Assistant Examiner*—David Divine
(74) *Attorney, Agent, or Firm*—Robert W. Becker & Associates

(57) ABSTRACT

An occupant impact protection system with an airbag that inflates when triggered whereby the protective effect of the inflated airbag is to be maintained beyond its service life. For this purpose it is provided that the airbag be foamable by means of particles introduced therein that are made of plastic that foam when activated and that are activated together with the introduction of the gas produced by the gas generator and a solid structure is formed for impact protection after the plastic foam hardens.

20 Claims, 4 Drawing Sheets

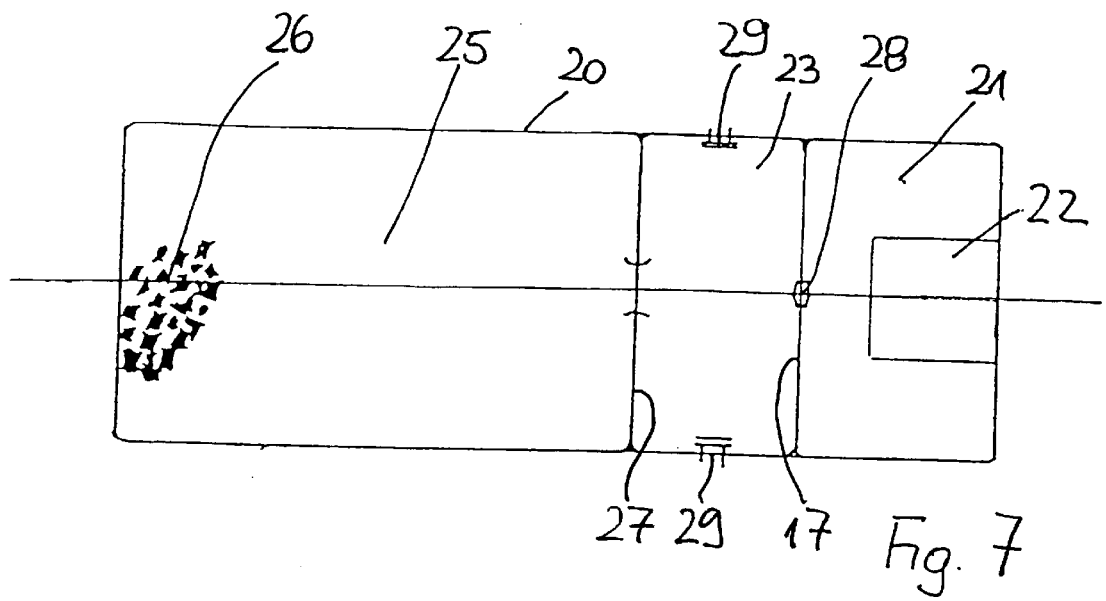
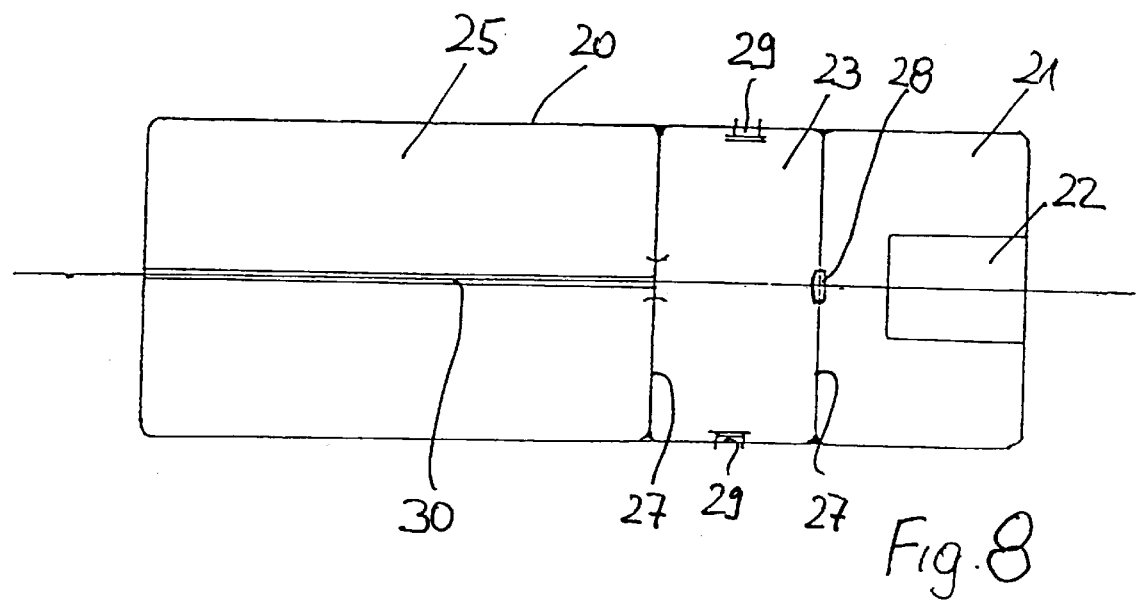

AIR BAG WITH AT LEAST ONE FOAMABLE CHAMBER

BACKGROUND OF THE INVENTION

The present invention relates to an occupant impact protection system, in particular for a motor vehicle, with an airbag that when triggered is to be inflated from its folded installed condition and furthermore with at least one gas generator, which is to be activated by means of an ignition apparatus and which contains a gas-producing material for producing the quantity of gas required to inflate the airbag.

Such occupant impact protection systems are known in a multiplicity of embodiments and today are installed in great numbers in mass-produced automobiles. During driving operations, when a critical accident situation occurs, sensors arranged appropriately in the vehicle trigger the gas generators, which then inflate the airbags, which are installed at different positions in the vehicle, by introducing therein the gas produced by the gas generators.

With a view especially toward multiple collisions or a vehicle rolling over several times during a prolonged accident period, the occupant impact protection system should have a sufficient service life, especially the airbags, and for this reason in many areas of the vehicle there are solid impact elements made of foamed plastics. Secondly, the inflated airbags should dampen the impact of the occupant on the airbag by intentionally discharging the gas that has been introduced (ventilation). Embodying a hose-like side airbag is known from U.S. Pat. No. 5,322,322; the airbag has an internal rubber bladder and an external airbag material. The known airbag is thus very dense and consequently does have a prolonged service life. However, in the case of head impact, it is so hard that it can only absorb a limited amount of energy and therefore causes the rebound effect, which is to be avoided.

The object of the present invention is therefore to embody an occupant protection system with the aforesaid features such that the protective effect of an inflated airbag is maintained beyond the service life of the gas-inflated airbag.

SUMMARY OF THE INVENTION

This object is achieved, including advantageous embodiments and further developments of the invention, from the contents of the patent claims that follow this specification.

The basic idea of the invention is that the airbag is foamable in at least part of its volume by means of particles introduced therein that are made of plastic or polymeric material that foam when activated and that are activated together with the introduction of the gas produced by the gas generator and a solid structure is formed for impact protection after the plastic foam hardens.

Known from DE-U-297 03 360 is providing a sealant in a liquid or solid form in a separate container, which sealant is absorbed by the gases produced upon ignition and is transported into the inflating airbag so that the sealant seals the interior surfaces of the inflated airbag and enhances its service life. A sustained improvement in the protective effect of the airbag is not associated therewith, in particular when the airbag is vented when there is an impact.

Furthermore known from DE 295 16 703 A1 and DE 196 24 328 A1 is arranging inflatable bodies on the exterior of a vehicle for damping the impact energy, which bodies are also to be filled with a foam.

Only the present invention is associated with the advantage that, in addition to the protective function of a gas-filled airbag in the interior of a vehicle, due to its partial foaming, the airbag has permanent stability under load, even after the gas introduced has been discharged (vented), and thus the elasticity of the plastic foam that has been introduced is available for further energy absorption so that it offers effective protection, in particular in multiple collisions.

In accordance with one exemplary embodiment of the invention, it is provided that the plastic particles are stored in the airbag and are activatable by means of the in-flowing gas, whereby preferably the plastic particles stored in the airbag form an internal coating on the airbag material that upon activation of the plastic particles constitute a solid foam structure that is separate from the airbag material. In this embodiment of the invention it can be provided that the gas produced by the gas generator contains an activating reagent for the plastic particles stored in the airbag.

An alternative option is for the plastic particles to be stored in the gas generator and to be taken up or absorbed by the gas flow produced in the gas generator and introduced into the airbag and activated for foaming therein. The plastic particles can be stored in liquid form or in solid form in the gas generator.

Such storage of the plastic particles in the gas generator is associated with the advantage that the stored plastic particles are activated in the airbag and they absorb energy, first from the heat that occurs from burning off the gas-producing material and second from the pressure of the gas flowing out of the pressure chamber so that a foam forms in the airbag that hardens after a short period of time and constitutes a permanent solid structure. Thus, even after the gas has been vented out of the airbag, a shape-stable protective body remains that continues to offer good and sufficient protection for the vehicle occupant during multiple impact or if the vehicle rolls over.

The plastic particles are to be selected and designed such that the plastic particles stored in the gas generator are small and light so that there are no rattling noises in the moving vehicle in the gas generator that has not yet been triggered. Furthermore, the plastic particles must be dimensioned such that they can flow through any discharge openings, even those provided with filter elements. In addition, during the discharge process, the particles must not be accelerated such that they damage the material of the airbag when they impact thereupon, thus bursting the airbag. Furthermore, when the plastic particles are activated, no smoke should occur that flows via any ventilation devices into the interior of the vehicle, and finally, the plastic particles must be of a quality that ensures a reliable foaming process both at very low and at very high temperatures.

In accordance with one exemplary embodiment of the invention, it can first be provided that the stored plastic particles are disposed in the gas generator together with the gas-producing material. Alternatively, a separate pressure chamber for storing the plastic particles cam be provided in the gas generator.

In accordance with one exemplary embodiment of the invention, it is provided that, in addition to the chamber containing the gas-producing material and the pressure chamber for receiving the plastic particles, the invention has a mixing chamber, whereby the discharge openings leading to the airbag are associated with the mixing chamber.

In a first exemplary embodiment the plastic particles present as granules and stored in the allocated chamber of the gas generator are stored in an inert gas atmosphere that is under pressure, whereby the particles preferably comprise polypropylene. When such a plastic is employed, a principle of the extrusion/injection process is used that is known in plastics engineering.

In an alternative embodiment the pressure chamber for receiving at least two components of a thermosetting plastic is set up in an inert gas atmosphere that is under pressure, whereby a polyurethane can be employed as such a thermosetting plastic, so that in this case the principle of a Duromer casting process is used, which is known in plastics engineering.

If the plastic particles are stored in an inert gas atmosphere that is under pressure, the inert gas used can be, for example, argon.

In accordance with one exemplary embodiment of the invention, the discharge openings are provided with filter elements that permit the plastic particles to flow through them.

With regard to the design of the airbag, in accordance with one exemplary embodiment the airbag is a single-chamber airbag, whereby the airbag filled with gas first provides the occupant lateral head protection and can vent gas by means of, e.g., its porous material or even specially provided ventilation openings so that it absorbs the occupant's energy on impact. The hardened plastic foam from the activation of stored plastic particles forms a solid structure in the airbag, which solid structure is the equivalent of padding and thus provides continuing protection for the vehicle occupant due to its permanent stability under load.

In accordance with an alternative exemplary embodiment of the invention the airbag has a plurality of chambers, of which at least one chamber is foamable by means of the plastic particles introduced therein and at least one other chamber is inflatable with the gas produced by the gas generator.

In a first alternative embodiment of the invention the foamed chamber within the airbag constitutes a support structure for the gas-filled chamber of the airbag. This is associated with the advantage that when a head impacts against such a solid plastic structure, there is both microdeformation of the individual plastic cells and macrodeformation of the entire structure, which is particularly advantageous when the gas-filled chamber has ventilation openings for intentionally venting the gas in accordance with one exemplary embodiment of the invention.

If the airbag has a plurality of chambers, in accordance with the invention the foamable chamber can surround the gas-filled chamber or the gas-filled chamber can surround the foamable chamber, whereby ventilation of the gas-filled chamber can be provided for adjusting the hardness of the airbag. The layer of foam provided in the foamable chamber hardens after a short period of time so that there is a solid structure in the airbag that itself still provides complete occupant protection with the capacity to absorb energy by means of venting escaped gas. In an alternative embodiment of the invention, the chambers can also be arranged mutually adjacent.

The invention can be used in a particularly useful manner in that the airbag is embodied as a side airbag and is disposed to protect the head against impact.

BRIEF DESCRIPTION OF THE DRAWING

The drawings illustrate exemplary embodiments for the design of a gas bag comprising a plurality of chambers as described in the following.

FIG. 7 is a side elevation of a gas generator with three chambers;

FIG. 8 is another embodiment of the subject of FIG. 7.

DESCRIPTION OF PREFERRED EMBODIMENTS

Figure 1:
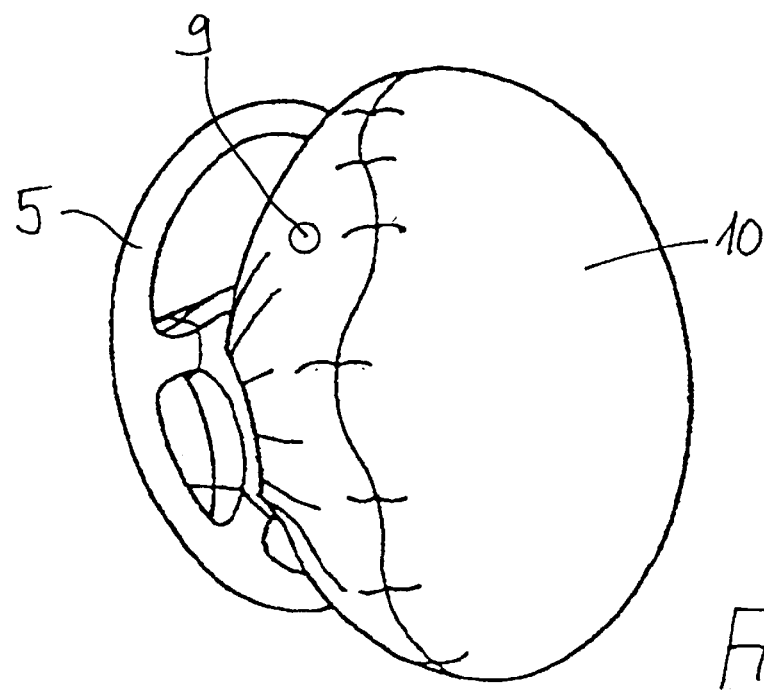
FIG. 1 illustrates a steering wheel with an inflated airbag as an exemplary embodiment for the design of the invention.
Figure 2:
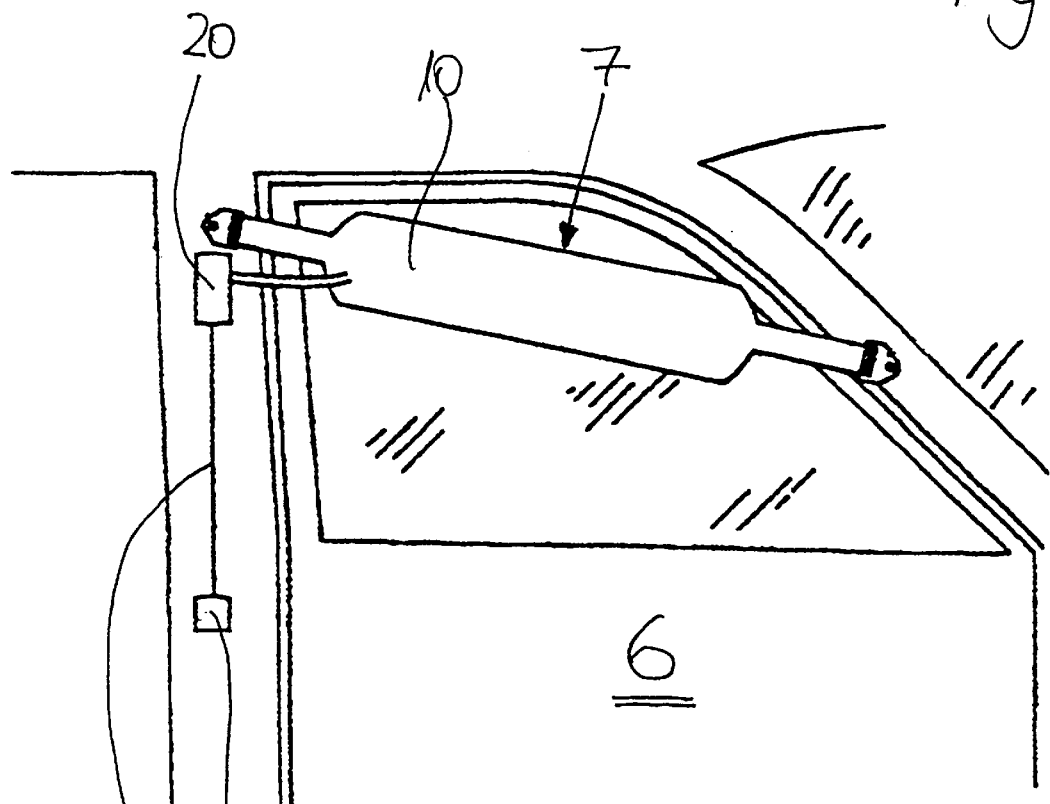
FIG. 2 is a sectional illustration of a side airbag in a further exemplary embodiment for the design of the invention.

As can be seen in FIG. 1, disposed in a steering wheel 5 is an airbag 10 that converts to the inflated shape shown in FIG. 1 when the gas generator (not shown) is triggered. In FIG. 2, an airbag 10 in the form of a side airbag 7 is illustrated as a second embodiment; it is arranged in a vehicle over the side door 6. The side airbag 7 is supplied with gas via a gas generator 20 that is ignited via a sensor 4 and a corresponding line 8.

Figure 3:
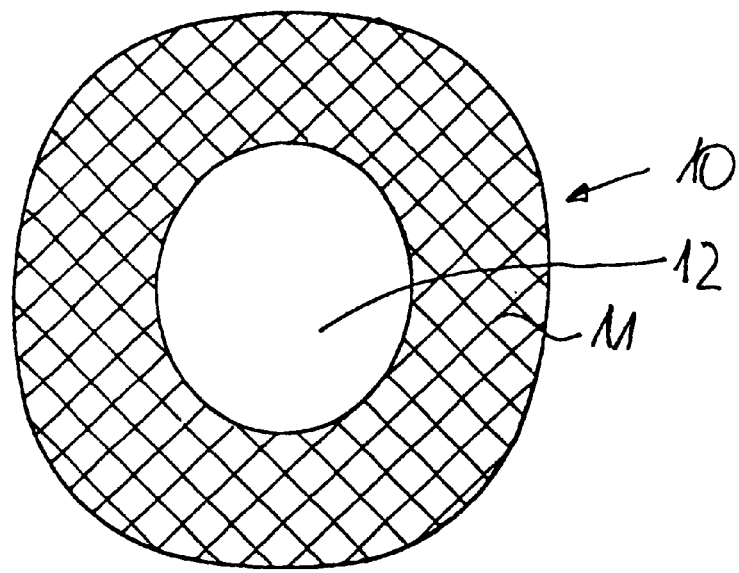
FIG. 3 illustrates an airbag with an inner gas-filled chamber and an outer foamable chamber.

As is illustrated in the drawing in FIG. 3, the airbag 10 can comprise two chambers, of which an outer chamber 11 is foamable and surrounds an inner chamber 12 that is filled with gas, whereby the inner chamber 12 can have a ventilation device 9 for enhancing the energy absorption of the airbag 10.

Figure 4:
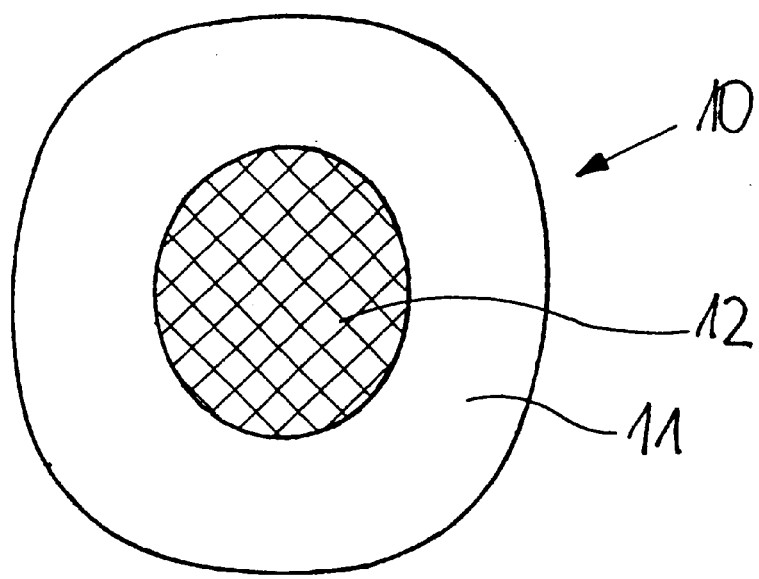
FIG. 4 illustrates an airbag with an inner foamable chamber and an outer gas-filled chamber.

FIG. 4 illustrates the reverse of the principle shown in FIG. 3 in that the inner chamber 12 is foamable, while the outer chamber 11 is filled with gas.

Figure 5:
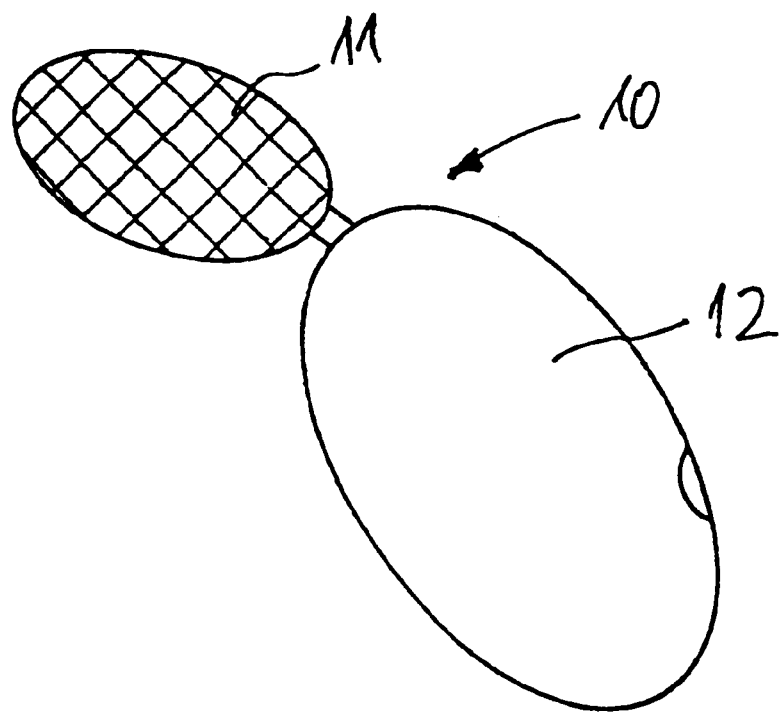
FIG. 5 illustrates an airbag with two chambers arranged mutually adjacent.

As can be seen in FIG. 5, the foamable chamber 11 and the chamber 12 that is filled with gas can also be arranged mutually adjacent, whereby this arrangement is especially useful as a side head airbag and the foamable chamber 11 is allocated to the head region of the occupant as impact protection for a roll-over crash.

Figure 6:
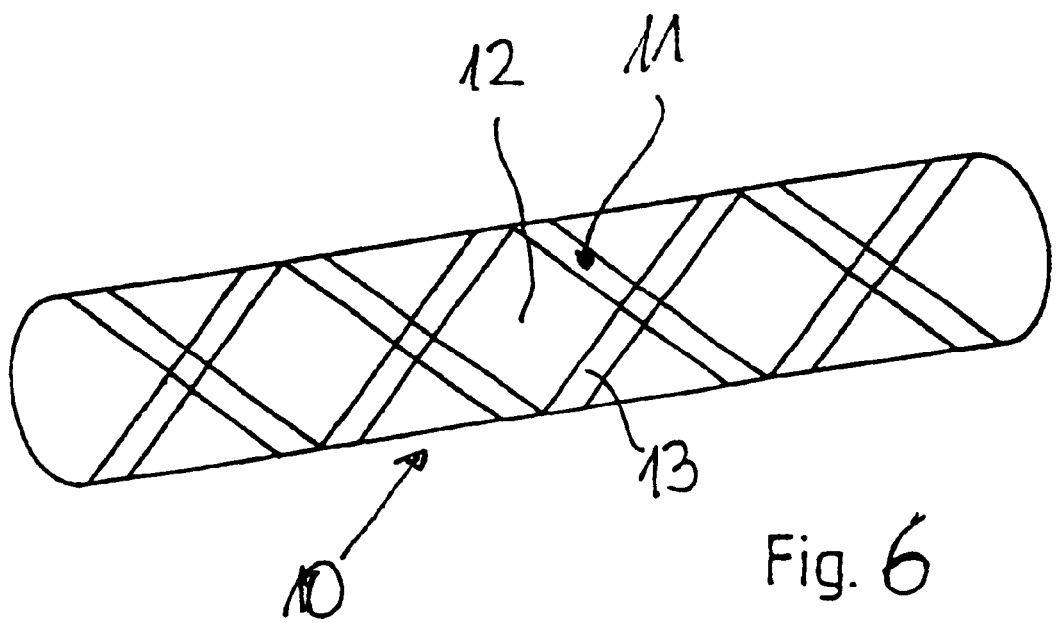
FIG. 6 illustrates an airbag having two chambers, in which the foamable chamber forms a skeletal structure.

Finally, it can be seen in FIG. 6, within the airbag 10 the foamable chamber 11 can have a design that forms a skeletal structure 13 in the foamable chamber 11 that imparts to the airbag 10 a permanent shape that is retained even after the gas introduced into the gas-filled chamber 12 has been vented.

FIGS. 7 and 8 illustrate the option of storing the plastic particles in the gas generator 20 and introducing the plastic particles into the airbag 10 with the gas discharging out of the gas generator 20.

The gas generator 20 illustrated in FIG. 7 has a first chamber 21 in which is disposed an ignition apparatus 22 and the gas-producing material. The first chamber 21 is separated by a first separating wall 17 from an adjacent mixing chamber 23, whereby a predetermined breaking point 28 is arranged in the separating wall 17. Discharge openings 29 exit from the mixing chamber 23; the gas produced in the gas generator 20 travels through these into the airbag attached to the gas generator 20. The discharge openings 29 can be provided with allocated filter elements.

Attached to the mixing chamber 23 via the interposition of another separating wall or partition 27 is a pressure chamber 25 in which plastic particles 26 are stored, and they are stored in an inert gas atmosphere that is under pressure produced by the addition of, for example, argon.

If an appropriate signal ignites the ignition apparatus 22 in the first chamber 21, the gas-producing material burns up, whereby the gas generated enters the mixing chamber explosively and thus also opens the separating wall 27 to the pressure chamber 25 so that the plastic particles 26 stored there under pressure are pulled into the mixing chamber 23 and from there are absorbed by the gas discharging via the discharge openings 29 and are transported into the inflating airbag. The plastic particles, which are in solid or liquid form, are activated in that they absorb energy from the heat of the gases produced and from the pressure of the gas discharging out of the pressure chamber 25, and as a consequence of the activation of the plastic particles 26 thus induced, a foam forms in the airbag that hardens after a short period and forms a solid structure in the airbag. Once the gas has escaped from the airbag, in particular in the framework of ventilation adjusted to dampen the occupant impact, the airbag remains as a protective element and is at least partially filled with hardened foam and offers further protection to the occupant, in particular if there are multiple impacts.

In the exemplary embodiment provided in FIG. 8, the pressure chamber 25 is divided by an intermediate wall 30 so that, e.g., two components of a thermosetting plastic can be stored in the pressure chamber 25 separate from each other, which components, when the gas generator is activated, are conducted via the mixing chamber 23 and the discharge process into the airbag and thus foam in the airbag.

The features of the subject of this invention that are disclosed in the foregoing specification, patent claims, abstract, and drawings can be essential individually and in any desired combination with each other for realizing the invention in its various embodiments.

The specification incorporates by reference the disclosure of German priority documents 199 12 531.7 and 199 12 540.6, both of Mar. 19, 1999.

The present invention is, of course, in no way restricted to the specific disclosure of the specification and drawings, but also encompasses any modifications within the scope of the appended claims.

What we claim is:

1. An occupant impact protection system, comprising:
   an airbag that upon activation is inflated from a folded, installed state;
   at least one gas generator that contains a gas-producing material and is activated by an ignition device for producing a quantity of gas required to inflate said airbag; and
   particles of polymeric material that foam when activated, wherein said particles are adapted to be introduced into said airbag for at least partially foaming out said airbag, wherein said particles are adapted to be activated together with introduction of gas from said gas generator into said airbag, and wherein said particles, after foaming, are adapted to harden into a solid structure as impact protection.

2. An impact protection system according to claim 1, wherein said polymeric particles are stored in said airbag and are activatable by means of gas introduced into said airbag.

3. An impact protection system according to claim 2, wherein said polymeric particles form an internal coating on material of said airbag, and wherein upon activation said particles form a solid foam structure that is separate from said material of said airbag.

4. An impact protection system according to claim 2, wherein gas produced by said gas generator contains an activating reagent for said polymeric particles stored in said airbag.

5. An impact protection system according to claim 1, wherein said polymeric particles are stored in said gas generator, and wherein said particles are taken up by a gas flow produced in said gas generator and introduced into said airbag for activation therein.

6. An impact protection system according to claim 5, wherein said polymeric particles are stored in said gas generator in liquid or solid form.

7. An impact protection system according to claim 5, wherein said polymeric particles are stored as granulate together with gas-producing material in a chamber of said gas generator.

8. An impact protection system according to claim 5, wherein gas-producing material is disposed in a first chamber of said gas generator, and wherein said polymeric particles are stored in a separate pressure chamber of said gas generator.

9. An impact protection system according to claim 8, wherein said gas generator is furthermore provided with a mixing chamber that is provided with discharge openings that lead to said airbag.

10. An impact protection system according to claim 5, wherein said polymeric particles are in the form of granules and are stored in a chamber of said gas generator in a pressurized inert gas atmosphere.

11. An impact protection system according to claim 5, wherein said polymeric particles comprise a thermoplastic material, such as polypropylene.

12. An impact protection system according to claim 8, wherein said pressure chamber is designed for a pressurized inert gas atmosphere, such as for argon, for receiving at least two components of a thermosetting plastic, such as polyurethane.

13. An impact protection system according to claim 9, wherein said discharge openings are provided with filter elements that permit said polymeric particles to flow through.

14. An impact protection system according to claim 1, wherein said airbag is a single-chamber airbag.

15. An impact protection system according to claim 1, wherein said airbag is provided with a plurality of chambers, at least one of which is foamable by means of said polymeric particles introduced therein, and wherein at least one other chamber of said airbag is inflatable with gas produced by said gas generator.

16. An impact protection system according to claim 15, wherein when said at least one chamber is foamed it provides a support structure within said airbag for a gas-filled chamber thereof.

17. An impact protection system according to claim 15, wherein said at least one other chamber that is inflatable with gas is provided with ventilation openings for intentional venting of gas.

18. An impact protection system according to claim 15, wherein said at least one foamable chamber surrounds said at least one chamber that is inflatable with gas, or said at least one chamber that is inflatable with gas surrounds said at least one foamable chamber.

19. An impact protection system according to claim 15, wherein said at least one foamable chamber and said at least one chamber that is inflatable with gas are disposed next to one another.

20. An impact protection system according to claim 1, wherein said airbag is a side airbag and is designed to protect the head of an occupant against impact.

\* \* \* \* \*